United States Patent
Nche et al.

(10) Patent No.: US 6,484,012 B1
(45) Date of Patent: *Nov. 19, 2002

(54) INTER-BAND COMMUNICATION REPEATER SYSTEM

(75) Inventors: Chi Nche, San Diego, CA (US); Ulun Karacaoglu, San Diego, CA (US)

(73) Assignee: Wireless Facilities, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/905,613

(22) Filed: Aug. 4, 1997

(51) Int. Cl.[7] ............................. H04B 7/14; H04Q 7/20
(52) U.S. Cl. .......................... 455/20; 455/17; 455/561; 455/446
(58) Field of Search .......................... 455/11.1, 14, 15, 455/16, 17, 20, 13.1, 7, 426, 552, 446, 447, 561; 370/315–328

(56) References Cited

U.S. PATENT DOCUMENTS

| | | | | |
|---|---|---|---|---|
| 4,006,315 A | * | 2/1977 | Halstead | 455/41 |
| 4,539,706 A | * | 9/1985 | Mears et al. | 455/11 |
| 4,764,979 A | * | 8/1988 | Noguchi et al. | 455/17 |
| 4,882,765 A | * | 11/1989 | Maxell et al. | 455/11.1 |
| 5,025,452 A | | 6/1991 | Sohner et al. | 375/1 |
| 5,081,703 A | * | 1/1992 | Lee | 455/20 |
| 5,152,002 A | * | 9/1992 | Leslie et al. | 455/16 |
| 5,309,479 A | | 5/1994 | Cheah | 375/62 |
| 5,377,255 A | * | 12/1994 | Beasley | 455/20 |
| 5,408,679 A | * | 4/1995 | Masuda | 455/16 |
| 5,603,080 A | * | 2/1997 | Kallender et al. | 455/15 |
| 5,604,789 A | * | 2/1997 | Lerman | 455/20 |
| 5,697,052 A | * | 12/1997 | Treach | 455/20 |
| 5,774,789 A | * | 6/1998 | Van Der Kaay et al. | 455/16 |
| 5,802,452 A | * | 9/1998 | Grandfield et al. | 455/17 |
| 5,809,398 A | * | 9/1998 | Moberg et al. | 455/17 |
| 5,812,538 A | * | 9/1998 | Wiedeman et al. | 455/12.1 |
| 5,890,055 A | * | 3/1999 | Chu et al. | 455/16 |
| 5,956,620 A | * | 9/1999 | Lazaris-Brunner et al. | 455/12.1 |
| 5,970,410 A | * | 10/1999 | Carney et al. | 455/446 |
| 5,987,304 A | * | 11/1999 | Latt | 455/17 |
| 6,047,177 A | * | 4/2000 | Wickman | 455/422 |
| 6,181,951 B1 | * | 1/2001 | Garner et al. | 455/552 |
| 6,243,577 B1 | * | 6/2001 | Elrefaie et al. | 455/426 |
| 6,370,384 B1 | * | 4/2002 | Komara | 455/447 |

FOREIGN PATENT DOCUMENTS

| | | | | |
|---|---|---|---|---|
| JP | 404111622 | * | 4/1992 | 455/20 |

OTHER PUBLICATIONS

Dodrill et al, Using Radio Link and Relays, Communication Engineering, Jan.–Feb. 1954, vol. 14.*

* cited by examiner

*Primary Examiner*—Vivian Chin
*Assistant Examiner*—Duc Nguyen
(74) *Attorney, Agent, or Firm*—Knobbe, Martens, Olson & Bear, LLP

(57) ABSTRACT

A system and method for converting carrier frequencies of a wireless communication system is provided. The system and method allow expansion of coverage areas of wireless communication systems, such as a mobile/cellular telephone system. In one embodiment, the system converts RF signals in the PCS band to ISM band, and transmits the ISM signals to a distant repeater station. The repeater station receives the ISM signals and downconverts the ISM signals to the PCS band. The PCS signals are retransmitted in a new cell thereby creating a new coverage area.

17 Claims, 4 Drawing Sheets

INTER-BAND COMMUNICATION REPEATER SYSTEM

BACKGROUND OF THE INVENTION

1. Field of the Invention

The present invention generally relates to voice and data communication systems. More particularly, this invention relates to wireless communication systems including conversion between frequency bands.

2. Description of the Related Art

Over the last decade, the deployment of wireless communication systems around the world has been phenomenal. Wireless communication technology has evolved along a logical path, from simple first-generation analog systems designed for business use to second-generation digital wireless communication systems for business and personal applications.

The first-generation analog systems include the Advanced Mobile Phone System (AMPS). The AMPS system is the widely used system in the United States. It uses cellular analog technology, now defined by the Electronics Industries Alliance ("EIA") specification EIA-553. The term "cellular" refers to dividing the service area into many small regions, called cells, each served by a low-power transmitter. Analog systems typically use analog frequency modulation (FM) for speech transmission and frequency shift keying (FSK) for signalling (i.e., control messages). In the United States, the AMPS uses frequency ranges of 824–849 MHz for mobile station transmissions (uplink), and 869–894 MHz for base stations transmissions (downlink). Additionally, a narrowband AMPS (N-AMPS) has also been deployed to increase capacity. N-AMPS divides an analog channel into three parts, thereby tripling the present analog channel capacity.

Outside the United States, there are two main international standards employing digital technology. These standards are the Global System for Mobile Communications (GSM/DCS-1800), and Japanese Digital Cellular (JDC). In the United States, the second generation digital wireless systems conform with the EIA IS-54 or IS-95 digital system standards. The EIA IS-54 standard employs time division multiple access (TDMA), and IS-95 employs code division multiple access (CDMA). Other systems conforming to the IS-136 (employing TDMA) and Personal Communications Services (PCS) standards are also now deployed in the United States.

Systems employing PCS technology operate in the frequency range 1850–1910 MHz for the uplink (i.e., mobile transmit, base receive) and 1930–1990 MHz for the downlink (i.e., base transmit, mobile receive). There are currently two communication standards operating in the PCS bands: a GSM-equivalent standard which employs a combination of TDMA and frequency division multiple access (FDMA), and a spreadspectrum standard employing code division multiple access (CDMA). Using TDMA, the users share the radio spectrum in the time domain. A user is allocated a time slot during which either the whole frequency band (wideband TDMA) or only a part of the band (narrowband TDMA) is accessed. Using FDMA, the users share the radio spectrum in the frequency domain. A user is allocated at least one unique frequency for communication without interference with users in the same frequency spectrum. Using CDMA, a transmitted signal is spread over a band of frequencies much wider than the minimum bandwidth required to transmit the signal.

PCS systems enable users to efficiently transfer any form of information between any desired locations. Basic needs for PCS include standardized low-power technology to provide voice and data to small, economical, pocket-size personal handsets. With other competitive systems already in place, PCS providers are tasked with finding creative ways of providing extensive service to their customers. To provide extensive coverage, however, PCS providers are confronted with a high equipment cost to provide additional cells. Additionally, government-imposed regulations on service providers may increase these costs if new virtual cells are not added within mandated deadlines.

To combat these problems, PCS providers have used repeaters to extend cell coverage area at its edge or fill-in dead spots within the cell. "Dead spots" are areas which have weak reception due to geographic barriers or RF interference. A repeater is a bi-directional radio frequency (RF) amplifier system which receives RF signals from a base transceiver station (BTS) of a donor cell, amplifies the RF signals and retransmits them to subscribers. A "donor cell" is the cell from which a repeater receives RF signals for further transmission. Conventional repeaters have been designed to operate in fringe areas (i.e., zones just outside the range of a BTS in which RF signals are weak).

One limitation of conventional repeaters is that they can only operate within the neighborhood of the donor cell, where RF coverage is inadequate. In certain situations, coverage may be required tens of miles away from the nearest BTS. To meet this demand, repeaters are cascaded, i.e., placed in geographic sequence, to further extend the coverage area of a BTS. However, cascading conventional repeaters to perform this task can be expensive and time consuming. More importantly, there are technical complications associated with cascading repeaters. One major complication is the associated overall time delay due to sequential repeaters, thereby limiting the maximum number of repeaters that can be cascaded without significant signal degradation.

In view of the foregoing, there is a need in the industry for a new repeater system which extends the coverage area in a wireless communication system without the disadvantages of conventional repeaters. The new repeater system should enable expansion of coverage areas without imposing time-delay or intra-band interference. This repeater system should expand coverage areas while maintaining minimal channel inter-cell interference or congestion. Furthermore, such system should be easy to install and maintain.

SUMMARY OF THE INVENTION

To overcome the above problems, the present invention provides a repeater system which allows the expansion of existing mobile communications coverage areas without the disadvantages of the prior art. The above-mentioned problems are solved by providing an inter-band repeater system which provides conversion of communication from cellular/mobile frequency bands to other frequency bands, such as the Industrial, Scientific and Medical (ISM) frequency bands. The ISM frequency bands allocated by the Federal Communications Commission (FCC) are spread across the frequency ranges of 902–928 MHz, 2400–2484 MHz, and 5725–5850 MHz. The repeater system provides full duplex communications while maintaining proper signalling schemes for a variety of wireless communication systems, such as mobile systems employing CDMA, TDMA, E-TDMA, FDMA, frequency hopping, or similar technologies.

In accordance with one embodiment of the present invention, the repeater system converts PCS signals to ISM frequency bands. The repeater system comprises two main substations: a near-end ISM band transceiver (the "NEIT" station) and a farend ISM band transceiver (the "FEIT" station). In one direction, called the forward link, the NEIT station receives PCS signals from a BTS of a donor cell, converts the carrier frequencies of the PCS signals to ISM frequencies, and transmits these signals using an antenna over ISM bands. The FEIT station receives these signals, converts the carrier frequencies of these signals to PCS frequencies, and transmits the PCS signals at the desired location. In effect, a new virtual cell is created at the desired location using the FEIT station of the repeater system. The repeater system implements all these steps without affecting signal quality. More importantly, the repeater system processes the PCS signals without interference with the signal modulation and schemes.

The repeater system supports full-duplex communication between a donor cell and a new virtual cell. Hence, the operation of the repeater system in the opposite direction, called the reverse link, is similar to that of the forward link. The PCS signal is preferably received by the BTS of the donor cell and re-transmitted by that BTS.

BRIEF DESCRIPTION OF THE DRAWINGS

The above and other aspects, features and advantages of the present invention will be better understood by referring to the following detailed description of the preferred embodiment, which should be read in conjunction with the accompanying drawings, in which.

DETAILED DESCRIPTION OF THE PREFERRED EMBODIMENT

The present invention provides an inter-band repeater system for expanding and creating new coverage areas in wireless communication systems. The repeater system comprises two main stations: a near-end transceiver station and a far-end transceiver station. The near-end transceiver station receives RF signals from an existing donor base transceiver station (BTS) operating in an original frequency band. The near-end transceiver station converts the RF signals to another frequency band for transmission to the far-end transceiver station. Upon receiving the signals, the far-end transceiver station converts the signals to the original frequency band, or to another desired frequency band, for retransmission in a new coverage area.

A detailed description of a PCS-ISM repeater system is provided below. As one embodiment of the present invention, it is not intended to limit the enumerated claims, but to serve as a particular example thereof.

Figure 1:
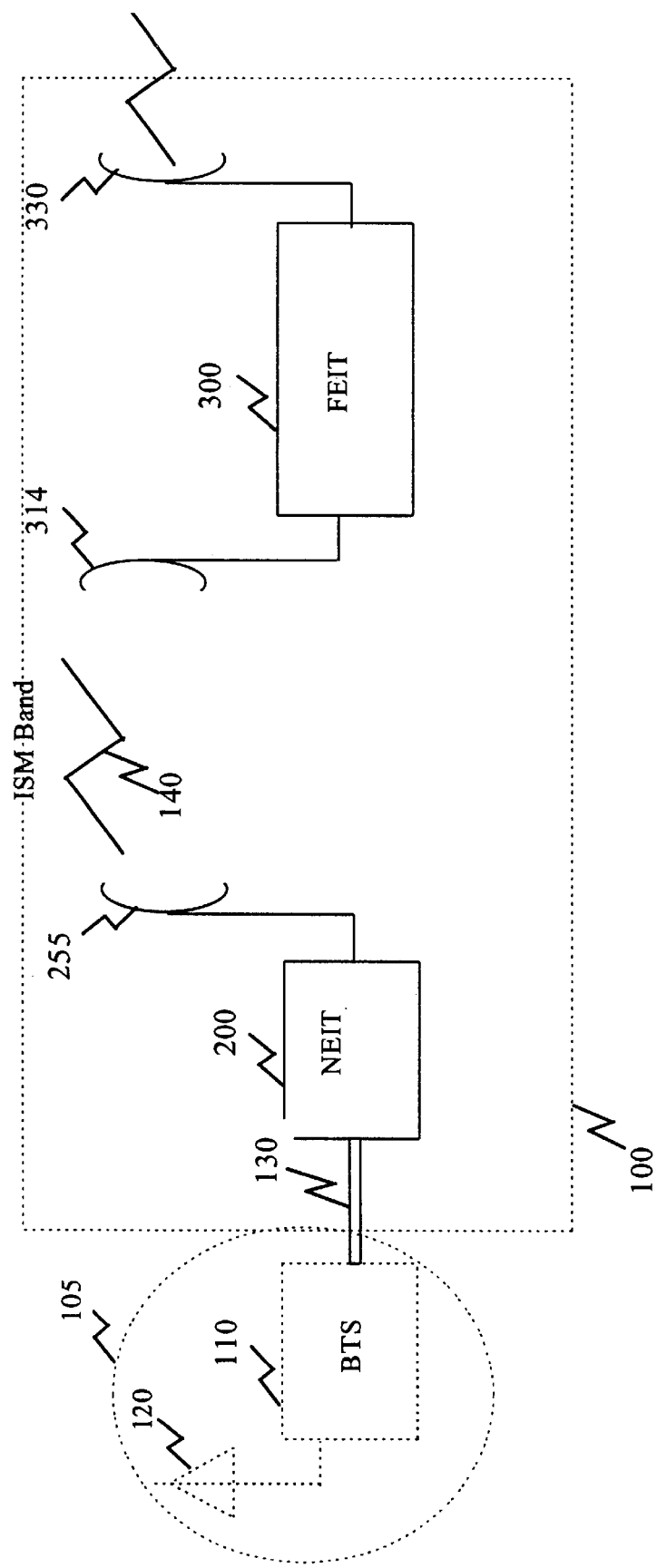
FIG. 1 is a functional block diagram depicting one embodiment of the interband repeater system using ISM bands.

FIG. 1 is a functional block diagram of one embodiment of the inter-band repeater system 100. The repeater system 100 supports full-duplex voice and/or data communications using a forward link (from a donor cell to a new cell) and reverse link (from the new cell to the donor cell) simultaneously. In doing so, conventional modulation/demodulation techniques and signal schemes, such as spread spectrum CDMA, are not changed. A BTS 110 is preferably a PCS CDMA base station. Therefore, the signal schemes for LM signals and PCS signals are the same.

Typically, the BTS 110 supports full-duplex voice and/or data communications using an omnidirectional, or two or more directional, antenna(s) 120 over a coverage area 105 (the "donor cell"). In the PCS band, the BTS 110 operates in the 1850–1910 frequency range for uplink (mobile transmit, BTS receive) communications, and in the 1930–1990 MHz frequency range for the downlink (BTS transmit, mobile receive) communications. More particularly, the carrier frequency for PCS CDMA signals is centered at 1880 MHz (with a bandwidth of 60 MHz) for the uplink, and 1960 MHz (with a bandwidth of 60 MHz) for the downlink.

In this embodiment, the system 100 comprises a near-end ISM transceiver ("NEIT") station 200 and a far-end ISM transceiver ("FEIT") station 300. On the forward link, the NEIT station 200 receives RF signals from the BTS 110 of the donor cell 105 via a cable 130. The cable 130 is a conventional non-radiating coaxial cable, whereby RF signals are transmitted with a low loss of signal strength. The cable 130 delivers to the NEIT station 200 RF signals in the PCS band 1850–1910 MHz for the forward link). These PCS signals preferably have signal power between −30 and 0 dBm. In case of weaker signals, a linear power amplifier (not shown) may be used at the NEIT 200 to amplify PCS signals. The NEIT station up-converts the carrier frequencies of the PCS signals from the 1850–1910 MHz band to one of the ISM bands, such as the 2400–2484 MHz band. After up-converting the PCS signals, the ISM signals are transmitted to the FEIT station 300 over an ISM link 140 preferably using a directional antenna 255. Although other kinds of antennas may be used, a high gain directional antenna may provide ISM transmission distances ranging up to 30 miles, depending on RF propagation conditions.

At the FEIT station 300, the ISM signals are downconverted from the ISM band to the PCS band (1930–1990 MHz) for retransmission. Then, the FEIT station 300 retransmits the PCS signals over a new virtual cell 410 (FIG. 4) to PCS band users. In effect, the coverage area of the donor cell 105 is expanded, or a new BTS station is created, tens of miles away with minimal delay or inter-PCS band interference. For the reverse link, steps similar to those discussed above are repeated in a reverse order.

Figure 2:
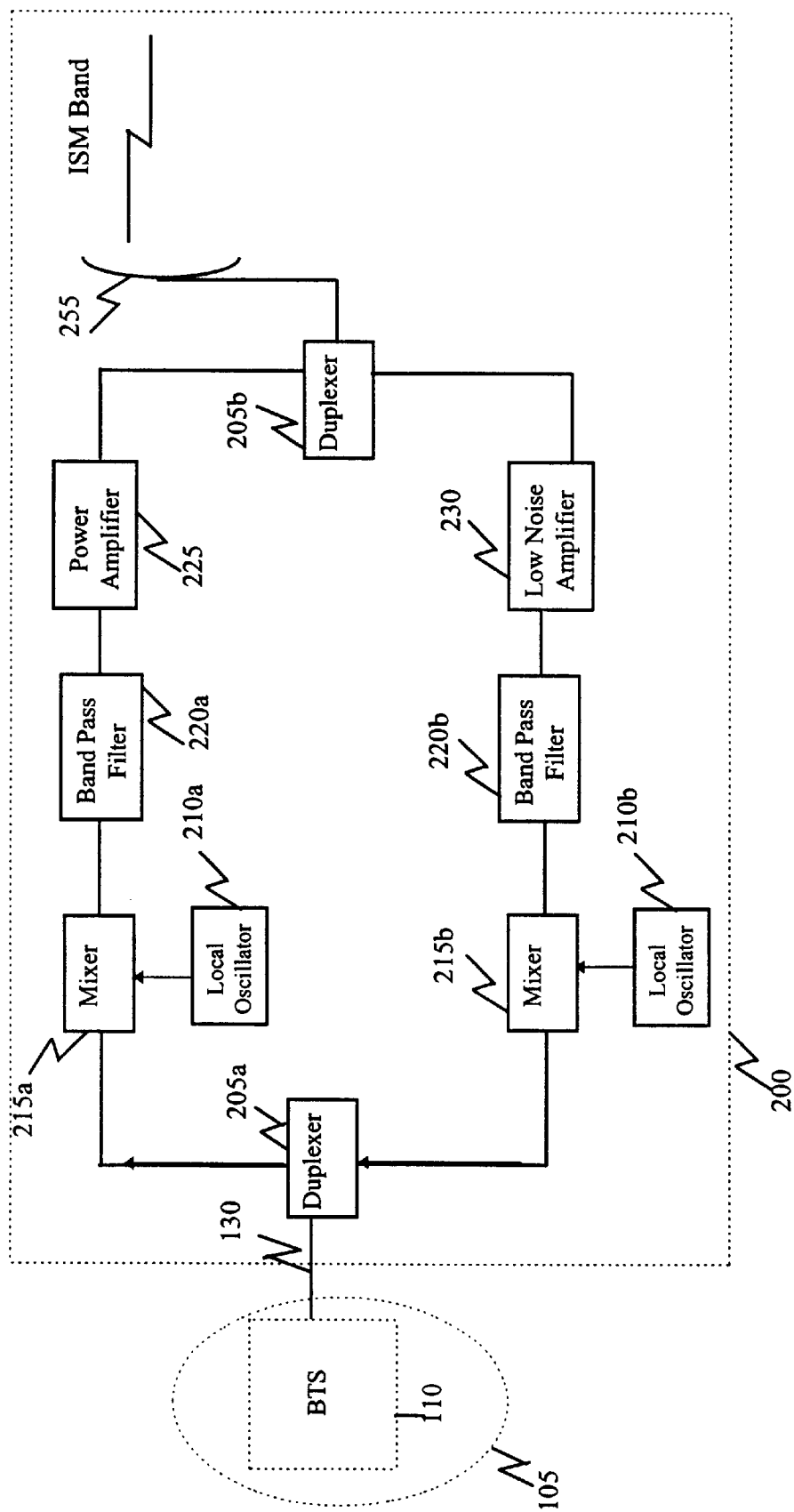
FIG. 2 is a functional block diagram of a near-end ISM transceiver (NEIT) station used in FIG. 1.

Referring now to FIG. 2, a functional block diagram of the near-end ISM transceiver (NEIT) station 200 used in the embodiment of FIG. 1 is shown. The NEIT station 200 receives RF signals from the BTS 110 of a donor cell 105 (FIG. 1) via the cable 130. The NEIT station 200 up-converts the RF signals to an ISM band and radiates these signals using a high gain directional antenna 255. In the forward link direction, the NEIT station 200 receives PCS signals through a first duplexer 205a connected to the BTS 110 (FIG. 1) via a cable 130. A mixer 215a is connected to the duplexer 205a to receive the PCS signals therefrom. A local oscillator 210a is connected to the mixer 215a for performing signal conversion. A band pass filter 220a is connected to the mixer 215a for filtering the processed signals. A power amplifier 225 is connected to the band pass filter 220a to amplify the signals. A second duplexer 205b is connected to the power amplifier 225 to filter the signals. The second duplexer 205b feeds the signals into a high gain directional antenna 255 for transmission.

In the reverse link direction, the duplexer 205b receives incoming ISM signals from the antenna 255. A low noise amplifier 230 is connected to receive the signals from the duplexer 205b for amplification. The low noise amplifier 230 feeds the signals to a band pass filter 220b for filtering the signals. A mixer 215b is connected to the band pass filter 220b to receive the signals for conversion. A local oscillator 210b is connected to the mixer 215b to perform signal conversion. The duplexer 205a is connected to the mixer 215b for filtering out the signals. Finally, the duplexer 205a feeds the signals to the BTS 110 via the cable 130 for retransmission.

As shown in FIG. 2, for the forward link, RF signals are fed directly into the duplexer 205a from the BTS 110 via the cable 130. RF signals may also be received without the duplexer 205a when obtained after the duplexing stage in the BTS 110, as would be understood by one skilled in the pertinent technology. The duplexer 205a filters out and attenuates noise of the RF signals. The filtered RF signals are fed into the mixer 215a where they are up-converted using the local oscillator 210a. The mixer 215a preferably has frequency ranges of 0.3 to 5 GHz (for RF-LO port) and 0.1 to 3 GHz (for IF port). One presently preferred mixer 215a is model number MD-154 manufactured by MACOM. The local oscillator 210a preferably has a frequency step size of 1.25 MHz and an operating band of 450–600 MHz. One presently preferred local oscillator 210a is model number V550 ML01 manufactured by ZCOM. The mixer 215a and local oscillator 210a enable the upconversion of PCS signals from 1850–1990 MHz to 2400–2484 MHz. The combination of the mixer 215a and the local oscillator 210a often generates undesired images (e.g., low-frequency noise). At this stage, the ISM signals are fed into a band pass filter 220a to eliminate any undesired images. The band-filtered signals are then fed into a power amplifier 225 for transmission. Typically, the power amplifier 325 has a gain of around 27 dB, a flatness of ±0.3 dB, and a maximum output power of 25 Watts. The power amplifier 225 amplifies the ISM signals for transmission via the high gain directional antenna 255.

The antenna 255 preferably has a gain of around 24 dBi and a beamwidth of around 10°. To minimize intra-signal interference, the ISM signals are first connected to a duplexer 205b for restricting out-of-band radiations.

For the reverse link, steps similar to those discussed above are repeated in a reverse order. The antenna 255 receives ISM signals from the FEIT 300 and feeds these signals into the duplexer 205b. The duplexer 205b filters out any undesired images. The ISM signals are then fed into the low noise amplifier 230 to strengthen the signal power for conversion. Prior to conversion, however, the band pass filter 220b filters out any noise generated due to amplification. The mixer 215b and local oscillator 210b are then used to downconvert the ISM signals to the PCS band (1850–1910 MHz). In one preferred embodiment, the same mixer and oscillator are used as specified for mixer 215a and local oscillator 210a. Finally, the duplexer 205a filters out any undesired images after conversion. The PCS signals are then fed into the BTS 110 via the cable 130. The NEIT station 200 is not necessarily restricted to the above delineated equipment characteristics. Other equipment having similar functionality may also be used.

Figure 3:
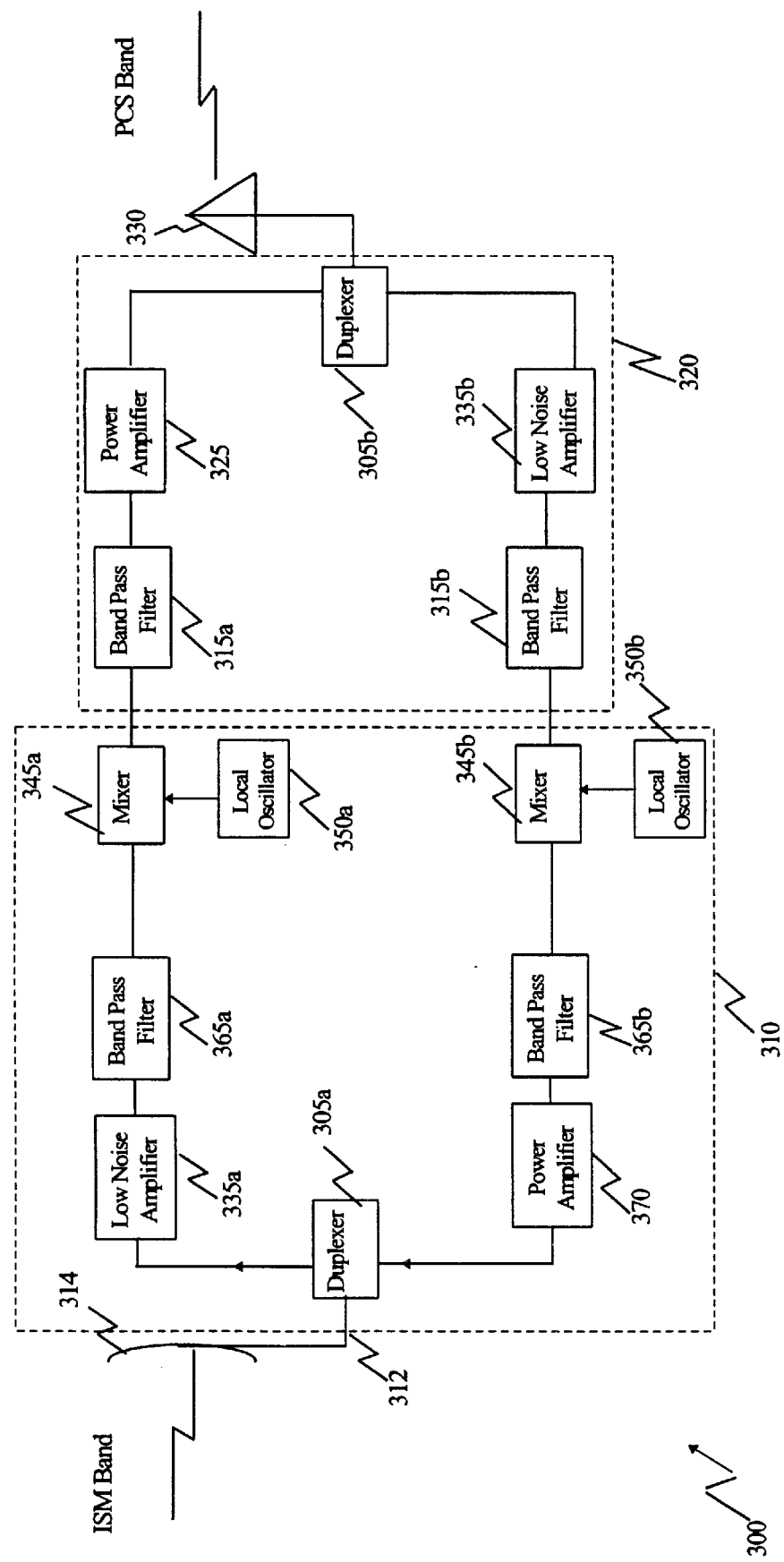
FIG. 3 is a functional block diagram of a far-end ISM transceiver (FEIT) station used in FIG. 1.
Figure 4:
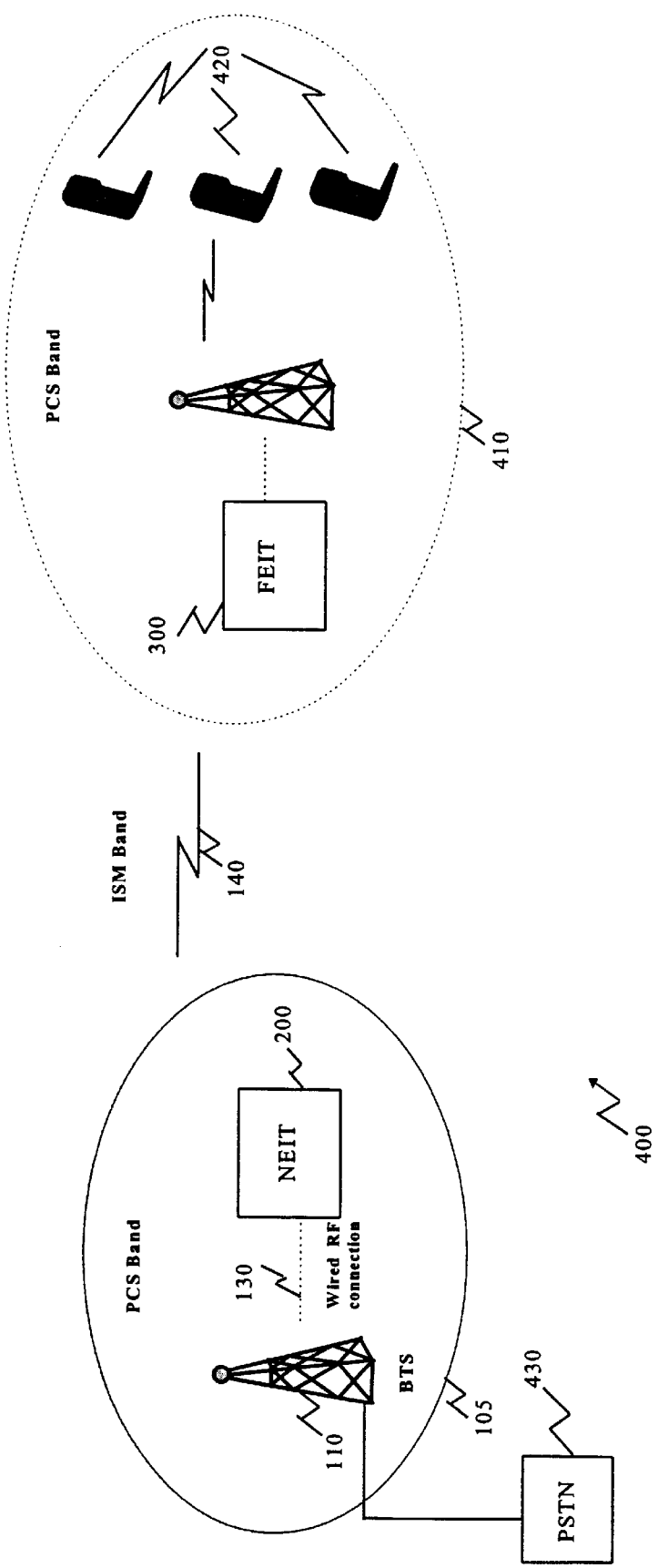
FIG. 4 is a pictorial representation of cell expansion in a mobile telephone system using the inter-band repeater system of the present invention.

Now referring to FIG. 3, a functional block diagram of a far-end ISM transceiver (FEIT) station 300 with the repeater system used in FIG. 1 is shown. The FEIT station 300 receives ISM signals from the NEIT station 200. The FEIT station down-converts the ISM signals to the PCS bands and re-radiates them to other PCS users thereby creating a new virtual cell 410 (FIG. 4). The FEIT station 300 receives ISM signals via an ISM band antenna 314, a far-end transceiver 310 transmitting and receiving signals through the ISM antenna 312, a PCS repeater 320 connected to the far-end transceiver 310, and a PCS band antenna 330 connected to the PCS repeater 320.

In the forward link direction, the far-end transceiver 310 receives ISM signals from the ISM band antenna 314 through a first duplexer 305a. The duplexer 305a is connected to the ISM band antenna 314 via a cable 312. A low noise amplifier 335a is connected to the duplexer 305a for amplifying the ISM signals. The low noise amplifier connects to a band pass filters 365a for filtering the signals. A mixer 345a is connected to the band pass filter 365a for signal conversion. The mixer 345a is connected to a local oscillator 350a to perform the signal conversion. The mixer 345a is connected to a band pass filter 315a of the PCS repeater 320. A power amplifier 325 is connected to the band pass filter 315a for amplifying the signals. A second duplexer 305b is connected to the power amplifier 325 for filtering the signals before transmission through a PCS antenna 330.

In the reverse link direction, the FEIT station 300 receives PCS signals from the antenna 330 through the duplexer 305b. The duplexer 305b feeds the signals into a low noise amplifier 335b for amplification. A band pass filter 315b is connected to the low noise amplifier 335b to filter the signals. The band pass filter 315b is connected to the a mixer 345b of the far-end transceiver 310. The mixer 345b is connected to a local oscillator 350b to perform signal conversion. A band pass filter 365b receives the signals from the mixer 345b for filtering the signals. The band pass filter 365b feeds the signals to a power amplifier 370 for amplification. The duplexer 305a receives the signals from the power amplifier 370 for transmission through the antenna 314.

As shown in FIG. 3, for the forward link, the ISM band antenna 314 receives the ISM signals from the NEIT station 200. The antenna 314 preferably has a gain of around 24 dBi and a beamwidth of around 10°. The ISM signals are fed directly into the duplexer 305a from the antenna 314 via a cable 312. The duplexer 305a filters out and attenuates spurious component of the ISM signals. The filtered ISM signals are fed into the low noise amplifier 335a to amplify the ISM signals in view of their weak strength upon reception. A band pass filter 365a is then used to filter out of band signals from the ISM signals. The characteristics of the band pass filter 365a are similar to those of the filter 220a (shown in FIG. 2). The filtered ISM signals are then fed into the mixer 365a where they are down-converted to the PCS band (1930–1990 MHz) using the local oscillator 350a. The characteristics of the mixer 345a and local oscillator 350a are similar to those of the mixer 215a and local oscillator 210a, respectively, of the NEIT station 200 (FIG. 2). As noted above, the combination of the mixer 345a and the local oscillator 350a often generates undesired images. Therefore, at the PCS repeater 320, the (now PCS) signals are fed into a band pass filter 315a to eliminate any undesired images. The band-filtered PCS signals are then fed into a power amplifier 325 for transmission. Typically, the power amplifier 325 has a gain of around 27 dB, a flatness of ±0.3 dB, and a maximum output power of 25 Watts. The power amplifier 325 amplifies the PCS signals for transmission via the antenna 330. To minimize intra-signal interference, the ISM signals are first passed through a duplexer 305b to restrict out of band radiations. The PCS repeater 320 supports full-duplex voice and/or data communications using an omnidirectional, or at least two directional, antenna(s) 330 over the new virtual cell 410 (FIG. 4).

For the reverse link, steps similar to those discussed above are repeated in a reverse order. The antenna 330 receives PCS signals in the uplink range (1850–1910 MHz) from multiple distant stations, such as mobile stations (MS) 420 (FIG. 4). The PCS signals are fed into the duplexer 305b to filter out noise. The low noise amplifier 335b is used to amplify the signal power of the received PCS signals. The band pass filter 315b is used to filter out any undesired images generated by the amplification stage. From the band pass filter 315b, the PCS signals are fed into the mixer 345b which, in conjunction with the local oscillator 350b, upconverts the PCS signals to the ISM band. The band pass filter 365b is then used to filter any noise generated by the conversion stage. The power amplifier 370 amplifies the ISM signals for transmission. Finally, the duplexer 305a is used to filter out any noise generated by amplification. The ISM signals are fed into the ISM band antenna 314 via the cable 312 for transmission to the NEIT station 200. The FEIT station 300 is not necessarily restricted to the above delineated equipment characteristics. Other equipment having similar functionality may also be used.

FIG. 4 is a pictorial representation of cell expansion in a mobile telephone system using the inter-band repeater system of the present invention. As shown in FIG. 4, a donor cell 105 typically comprises a base transceiver station (BTS) 110 operating in the PCS band. The BTS 110 of the donor cell is typically connected to a public switched telephone network (PSTN) 430 for communication to the rest of the world. In this embodiment, the NEIT station 200 (FIG. 2) converts PCS signals to ISM signals and, then, transmits them over the ISM link 140. At the new virtual cell 410, the FEIT station 300 (FIG. 3) converts the ISM signals to PCS signals and transmits them over the new virtual cell 410 to distant stations 420, such as mobile stations (MS). Using the repeater system 100 (FIG. 1), the coverage area of the PCS donor cell 105 is in effect expanded by creating the new virtual cell 410 without the expense of provisioning a new PCS station. The reduction in expense is mainly due to the ability of the repeater system 100 to transparently transfer all signal intelligence and schemes from the donor cell 105 to the new virtual cell 410. In doing so, the repeater system 100 minimizes, and perhaps eliminates, the need for any intelligent hardware or software at the new virtual cell 410.

In view of the foregoing, it will be appreciated that the present invention overcomes the longstanding need for expanding coverage areas of wireless communication base stations without the disadvantages of cascaded repeaters, or the expense of provisioning new entire base stations. The present invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A wireless communication system for converting carrier frequencies of a radio frequency (RF) signal, comprising:
    a near-end station receiving a signal having at least one original carrier frequency in a cellular frequency band, the near-end station including:
        a near-end converter converting the original carrier frequency to at least one different higher carrier frequency in a noncellular frequency band and wherein the near-end converter does not change the modulation or signalling scheme of the signal having the original carrier frequency, and
        a near-end transmitter transmitting the signal having the different higher carrier frequency; and
    a far-end station including:
        a far-end converter converting the different higher carrier frequency to the original carrier frequency and wherein the far-end converter does not change the modulation or signalling scheme of the signal having the original carrier frequency, and
        a far-end transceiver receiving the signal having the different higher carrier frequency from the near-end transmitter, and transmitting the signal having the original lower carrier frequency.

2. The wireless communication system as defined in claim 1, wherein the wireless communication system is a cellular communication system.

3. The wireless communication system as defined in claim 1, wherein the near-end station receives the signal having at least one original carrier frequency from the wireless communication system via a RF cable.

4. The wireless communication system as defined in claim 1, wherein the original carrier frequency is in the PCS band, and the different higher carrier frequency is in the ISM band.

5. The wireless communication system as defined in claim 1, wherein the signal having at least one original carrier frequency is a CDMA signal.

6. The wireless communication system as defined in claim 1, wherein each of the near-end and far-end converters include a mixer and an oscillator.

7. The system of claim 1, wherein the far-end transceiver transmits the signal having the original lower carrier frequency to cover a geographical cell area.

8. The system of claim 7, wherein the far-end transceiver transmits the signal having the original lower carrier frequency via an external antenna.

9. The system of claim 1, wherein the far-end transceiver transmits the signal having the original lower carrier frequency to an area external to a cell coverage area of a cell from which the signal having the original lower carrier frequency is received.

10. The system of claim 9, wherein the far-end transceiver transmits the signal having the original lower carrier frequency to a cell geographically external to a cell from which the signal having the original lower carrier frequency is received.

11. A communication system for converting carrier frequencies of a radio frequency (RF) signal, comprising:
   a far-end station receiving a signal having at least one original carrier frequency in a cellular frequency band, the far-end station including:
      a far-end converter converting the original carrier frequency to at least one different higher carrier frequency in a noncellular frequency band and wherein the far-end converter does not change the modulation or signalling scheme of the signal having the original carrier frequency, and
      a far-end transceiver receiving the signal having the original carrier frequency, and transmitting the signal having the different carrier frequency; and
   a near-end station including:
      a near-end receiver receiving the signal having the different carrier frequency from the far-end transceiver; and
      a near-end converter converting the different carrier frequency to the original carrier frequency and wherein the near-end converter does not change the modulation or signalling scheme of the signal having the original carrier frequency.

12. The system as defined in claim 11, wherein the near-end station communicates the signal having the original carrier frequency to a cellular communication system via a RF cable.

13. The system as defined in claim 11, wherein the original carrier frequency is in the PCS band, and the different carrier frequency is in the ISM band.

14. The system as defined in claim 11, wherein the signal having at least one original carrier frequency is a CDMA signal.

15. The system as defined in claim 11, wherein each of the near-end and far-end converters include a mixer and an oscillator.

16. The system of claim 11, wherein the far-end station receives the signal having at least one original carrier frequency in a cellular frequency band directly from an external antenna of a geographically remote cell.

17. The system of claim 11, wherein the far-end transceiver receives the signal having at least one original carrier frequency in a cellular frequency band from an area geographically external to a cell coverage area which receives, from the near-end station, the al having the original carrier frequency.

* * * * *